United States Patent [19]

Hegner et al.

[11] Patent Number: 5,400,489
[45] Date of Patent: Mar. 28, 1995

[54] METHOD OF STABILIZING THE SURFACE PROPERTIES OF OBJECTS TO BE THERMALLY TREATED IN A VACUUM

[76] Inventors: Frank Hegner, Chrischonastrasse 41, W-7850 Lörrach; Ulfert Drewes, Mozartstrasse 10, W-7843 Heitersheim, both of Germany

[21] Appl. No.: 968,811

[22] Filed: Oct. 30, 1992

[30] Foreign Application Priority Data

Nov. 30, 1991 [EP] European Pat. Off. ........... 91120640

[51] Int. Cl.⁶ .................. H01G 7/00; G01L 1/22; G01L 9/12; B05D 3/12
[52] U.S. Cl. ............................. 29/25.41; 29/621.1; 228/121; 73/718; 338/2; 338/5; 427/240
[58] Field of Search .................. 29/621.1, 25.41; 228/121, 122, 124; 73/718; 338/2, 5; 427/240

[56] References Cited

U.S. PATENT DOCUMENTS

| | | |
|---|---|---|
| 2,329,632 | 9/1943 | Marsden, Jr. . |
| 3,811,918 | 5/1974 | Levene . |
| 4,511,877 | 4/1985 | Nishikawa et al. ............. 29/621.1 |
| 4,630,491 | 12/1986 | Kitagawa et al. .................. 338/2 |
| 4,841,272 | 6/1989 | Yamagishi et al. ............. 29/621.1 |
| 5,001,595 | 3/1991 | Dittrich et al. .................. 73/718 |
| 5,050,034 | 9/1991 | Hegner et al. .................. 73/718 |

FOREIGN PATENT DOCUMENTS

| | | |
|---|---|---|
| 0445382 | 9/1991 | European Pat. Off. . |
| 268167 | 11/1987 | Japan . |
| 122572 | 5/1990 | Japan . |
| WO82/04125 | 11/1982 | WIPO . |
| WO90/12299 | 10/1990 | WIPO . |

OTHER PUBLICATIONS

S. K. Gupta, "Spin-on Glass for Dielectric Planarization", Microelectronic Manufacturing and Testing, vol. 12, No. 5, Apr. 1989, pp. 1 and 10–12.

*Primary Examiner*—P. W. Echols
*Attorney, Agent, or Firm*—Barnes & Thornburg

[57] ABSTRACT

To avoid any deterioration of the surface properties of objects of ceramic, glass, or a single-crystal insulating material which are subjected to a vacuum temperature process, a thin layer of a spin-on glass solution with a silicon-dioxide equivalent of not more than 10% is applied to the objects by spinning or spraying prior to the vacuum temperature process. This is particularly important to avoid the strong moisture dependence of capacitive or resistive pressure sensors having a substrate and a diaphragm to be joined together, forming a chamber sealed at least at the edge. The diaphragm is covered with a layer of silicon carbide, niobium, or tantalum serving as one capacitor electrode, or the surface portion of the diaphragm which will lie within the chamber is coated with at least one strain gage; the portion of the substrate surface which will lie within the chamber is coated with at least one additional capacitor electrode or, in the case of the resistive pressure sensor, not coated therewith; over the entire surface portion of the substrate and diaphragm thus coated, a thin layer of the spin-on glass solution is applied and dried; contact is made to the capacitor electrodes or strain gages through the substrate and/or diaphragm, and substrate and diaphragm are brazed together by a ring-shaped part of active brazing material, which also serves as a spacer, or by a sufficient amount of active brazing paste.

22 Claims, 2 Drawing Sheets

METHOD OF STABILIZING THE SURFACE PROPERTIES OF OBJECTS TO BE THERMALLY TREATED IN A VACUUM

BACKGROUND OF THE INVENTION

The present invention relates to a method of stabilizing the surface properties of objects which are subjected to a vacuum temperature process.

Such a process step is used, for example, in the manufacture of pressure sensors. U.S. Pat. No. 50 50 034, for example, describes the manufacture of a capacitive pressure sensor having a substrate and diaphragm which are to be joined together, particularly in a defined spaced relationship and parallel to each other, forming a chamber sealed at least at the edge, the substrate and/or the diaphragm being made of ceramic, glass or a single-crystal insulating material. This method comprises the following steps. The diaphragm is covered with a layer of silicon carbide, niobium or tantalum which serves as one of the capacitor electrodes; a portion of the substrate surface which will lie within the chamber is covered with at least one additional layer of any of the aforementioned conductive materials which serves as the second etc. capacitor electrode; contact is made to the capacitor electrodes through the substrate, and substrate and diaphragm are high-vacuum-brazed together by means of a ring-shaped part of active brazing material, which also serves as a spacer, or by means of an amount of active brazing paste sufficient for holding the two parts at the desired distance from each other. The ring-shaped part is spaced apart from the second capacitor electrode formed on the substrate surface to electrically isolate the first and second capacitor electrodes.

Pressure sensors thus manufactured are extremely moisture-sensitive, which greatly reduces the Q of the capacitor(s) in particular. Investigations have shown that this moisture sensitivity is not due to changes in the electrodes or the strain-gage material during the high-vacuum brazing, but that in this process step the uncovered surface portions of substrate and diaphragm change so that they, instead of retaining their very good insulating ability, become semiconducting and highly moisture-sensitive.

For example, an experimental capacitive reference pressure sensor with a 60-pF precision capacitor and a 60-pF reference capacitor exhibited, at zero pressure, a capacitance difference of 1.5 pF at a tan-delta difference of 0.05 and a reference-capacitance difference of 3 pF at a tan-delta difference of 0.1 for a change in relative humidity from 30% to 85% (at a temperature of 20° C.).

Furthermore, prior to the high-vacuum brazing, an experimental substrate of alumina ceramic with 96% purity on which two concentric coatings are deposited to form said second capacitor electrode of the above precision and reference capacitors were deposited at a distance of 1 mm from each other, with the inner electrode having a diameter of 16 mm, showed a resistance, measured between these two electrodes, of $4 \times 10^{13}$ ohms in a dry atmosphere (=0% relative humidity), but a resistance of $1 \times 10^{11}$ ohms at 70% relative humidity (again at 20° C.). After the high-vacuum brazing, the corresponding resistance values were $3 \times 10^{13}$ ohms for a dry atmosphere and only $3 \times 10^{8}$ ohms for 70% relative humidity.

These investigations led to the recognition that as a result of the high-vacuum brazing, those surface portions of the substrate and diaphragm which will not be covered within the chamber to be formed lose oxygen or nitrogen atoms, i.e., that these surface portions are reduced. This results in these portions becoming semiconducting, for example, which causes the above-mentioned degradation of the Q of the capacitors and the changes in capacitance.

Thus, as a rule, vacuum temperature processes do not leave the surface properties of the treated objects unaffected and mostly deteriorate them.

The invention serves to solve this problem.

SUMMARY OF THE INVENTION

Accordingly, the invention consists in a method of stabilizing the surface properties of objects of ceramic, glass, or a single-crystal insulating material which are subjected to a temperature process, particularly a high-temperature process, in a vacuum, particularly a high vacuum, and to which a thin layer of a spin-on glass solution with a silicon-dioxide equivalent of not more than 10% is applied by spinning or spraying, and dried.

The invent ion further consists in a method of manufacturing a capacitive pressure sensor having a substrate and a diaphragm to be joined together, particularly in a defined spaced relationship and parallel to each other, forming a chamber sealed at least at the edge, with the substrate and/or the diaphragm made of ceramic, glass, or a single-crystal insulating material, comprising the following steps:

The diaphragm is covered with a layer of silicon carbide, niobium, or tantalum serving as one capacitor electrode;

the portion of the substrate surface which will lie within the chamber is covered with at least one additional layer of any of said conducting materials serving as the second etc. capacitor electrode(s);

over the entire surface portion of the substrate and diaphragm thus covered, a thin layer of a spin-on glass solution with a silicon-dioxide equivalent of not more than 10% is applied by spinning or spraying, and dried;

contact is made to the capacitor electrodes through the substrate and, if necessary, through the diaphragm, and substrate and diaphragm are high-vacuum-brazed together by means of a ring-shaped part of active brazing material, which also serves as a spacer, or by means of an amount of active brazing paste sufficient for holding the two parts at the desired distance from each other.

The invention further consists in a method of manufacturing a resistive pressure sensor having a substrate and a diaphragm to be joined together, particularly in a defined spaced relationship arid parallel to each other, forming a chamber sealed at least at the edge, with the substrate and/or the diaphragm made of ceramic, glass, or a single-crystal insulating material, comprising the following steps:

The surface portion of the diaphragm which will lie within the chamber is covered with at least one strain gage;

over the entire surface portion of the diaphragm thus covered and over the entire surface portion of the substrate which will lie opposite said surface portion of the diaphragm, a thin layer of a spin-on glass solution with a silicon-dioxide equivalent of not more than 10% is applied by spinning or spraying, and dried;

contact is made to the at least one strain gage through the diaphragm, and substrate and diaphragm are high-vacuum-brazed together by means of a ring-shaped part of active brazing material, which also serves as a spacer, or by means of an amount of active brazing paste sufficient for holding the two parts at the desired distance from each other.

According to an advantageous feature of the subject matter of the invention the capacitor electrodes are covered with a protective layer prior to the application of the spin-on glass solution.

The spin-on glass solutions used in the invention have so far only been employed in the fabrication of a specific class of products from quite different materials than ceramic, glass, or single-crystal insulating materials, namely in semiconductor technology in the fabrication of integrated circuits, and there for a different purpose, namely for planarizing their surfaces, i.e., for levelling surface irregularities caused by the multiple process steps, cf. an article by S. K. Gupta, "Spin-On Glass for Dielectric Planarization", published in the journal "Microelectronic Manufacturing and Testing", April 1989.

Surprisingly, the spin-on glass solutions described in that article can be used to eliminate the above-described disadvantages associated with the materials mentioned above.

The invention will now be explained, by way of example, with reference to the accompanying drawings, in which like parts are designated by like reference characters.

DETAILED DESCRIPTION OF THE INVENTION

The fundamental idea of the invention will now be described with respect to the manufacture of the pressure sensors shown in the figures, i.e., there is no separate figure for the subject matter of claim 1, since such a figure would only show an arbitrary object with a thin layer around it, which is obvious.

Figure 1:
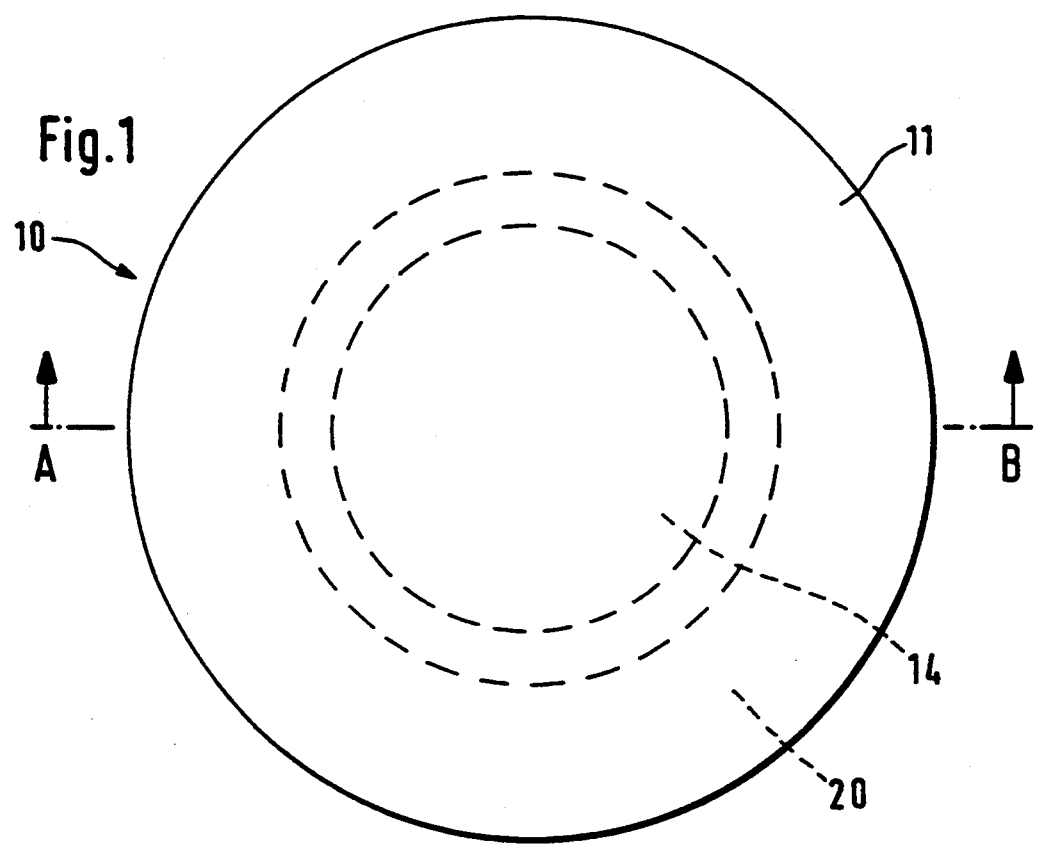
FIG. 1 is a top view of a capacitive pressure sensor made in accordance with the invention.
Figure 2:
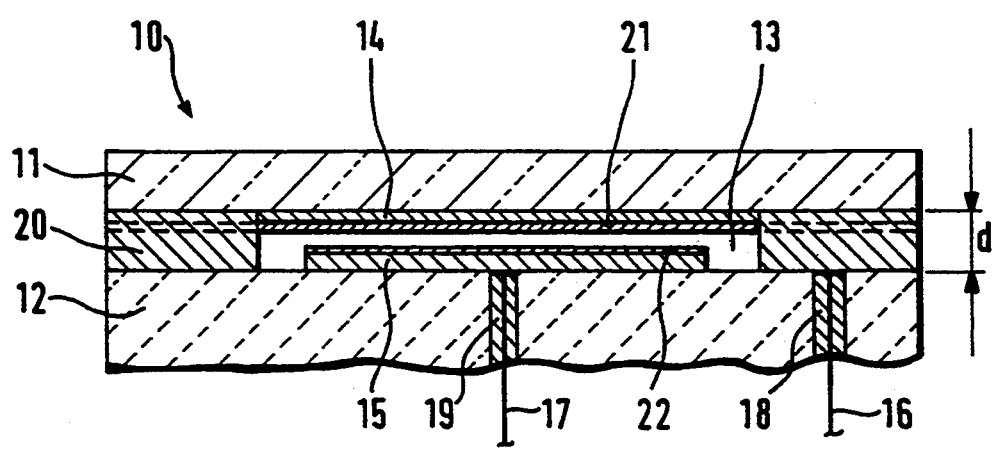
FIG. 2 is a section taken along line A-B of FIG. 1.

The capacitive pressure sensor 10 shown in FIGS. 1 and 2 has a diaphragm 11 in the form of a circular plate with plane-parallel surfaces which is joined around the periphery by a ring-shaped part 20 made from an active brazing material to a circular substrate 12 at a defined distance d therefrom, thus forming a chamber 13 between the top side of the substrate 12 and the opposite surface of the diaphragm 11.

The diaphragm 11 may be formed from ceramic, preferably alumina ceramic with a purity of 96 wt. %, glass, or a single-crystal insulating material, such as sapphire. The materials of substrate 12 and diaphragm 11 may differ.

The diaphragm 11 is elastic, so that it can deform when a force or pressure is applied to it. The substrate 12 may be solid or rigid, which can be achieved, for example, by a thickness greater than that of the diaphragm. It may also be designed as a flat, elastic and, hence, deflectable plate like the diaphragm.

The surfaces of diaphragm 11 and substrate 12 which face each other are provided with circular capacitor electrodes 14, 15 of a suitable metal, namely niobium, tantalum or conductive silicon carbide, which lie opposite each other within the chamber 13. The electrode 14 covers the diaphragm 11 completely, but it may also be provided only in the chamber area. Each of the electrodes 14, 15 may be covered with a protective layer 21, 22 at its chamber-side, free surface, as is shown in FIG. 2. This protective layer is made, for example, of one of the oxides of the material from which the electrodes are formed. In the case of tantalum, this is preferably tantalum pentoxide.

Connected to the electrodes 14 and 15 are leads 16 and 17, respectively, which are brought out through the substrate to its rear side. The electrical connection to the diaphragm electrode 14 is made via the lead 16 and the active brazing material of the ring-shaped part 20, but this part is not mandatory.

If the diaphragm electrode does not cover the entire diaphragm surface but is only provided in the region of the chamber 13 as mentioned above, contact must be made to it through the diaphragm 11 in the same manner as in the case of the electrode on the substrate. To this end, contact is made to the leads 16 and 17 by means of inserts 18 and 19, respectively, of active brazing material. Instead of these inserts, leads covered with active brazing material can be used.

An active brazing solder is a hard solder which contains at least one highly reactive element, such as titanium, zirconium, beryllium, hafnium, or tantalum. During the brazing process, these reactive elements wet the surfaces of the parts to be brazed. In the case of (aluminum-) oxide ceramic, the high affinity of the reactive elements for oxygen causes a reaction with the ceramic, which results in the formation of mixed oxides and free chemical valences. The reactive component of the brazing solder is embedded in a matrix of other alloying elements, such as silver/copper, which form the active brazing material proper.

The two electrodes 14, 15 form a capacitor whose capacitance depends on the distance between the electrodes. When the diaphragm 11 deforms under the action of a force or pressure, the distance between the electrodes changes, thereby changing the capacitance of the pressure sensor. This change can be measured by means of an electronic circuit to be connected to the leads 16, 17, and can thus be a measure of the pressure or force acting on the diaphragm 11.

Figure 3:
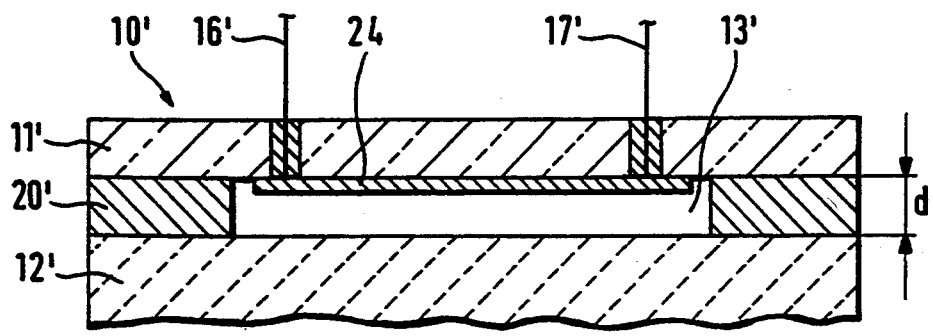
FIG. 3 is a section, corresponding to that of FIG. 2, of a resistive pressure sensor made in accordance with the invention.

The resistive pressure sensor 10' shown in FIG. 3 in a sectional view has a diaphragm 11' in the form of a circular plate with plane-parallel surfaces which is joined around the circumference by a ring-shaped part 20' made from an active brazing material to a circular substrate 12' in a defined spaced relationship d therefrom, so that a chamber 13' is formed between the top side of the substrate 12' and the opposite surface of the diaphragm 11'. What was said above about the materials suitable for, and the elasticity of, the substrate and diaphragm of, the capacitive pressure sensor applies equally to the resistive pressure sensor.

Attached to one surface of the diaphragm 11' is at least one strain gage 24, e.g., a half-bridge arrangement of two strain gages or a full-bridge arrangement of four strain gages, which is connected to two leads 16', 17' brought out through the diaphragm 11', i.e., to the rear side thereof, in a gas-tight manner.

The resistance of the strain gages is dependent on the deflection of the diaphragm 11' resulting from the action of a force or pressure. This change in resistance can be measured by means of an electronic circuit to be connected to the leads 16', 17', and can thus be a measure of the pressure or force acting on the diaphragm 11'.

If the chamber 13, 13' is evacuated, only an external pressure is applied to the capacitive or resistive pressure sensor 10, 10'. If the chamber has an external opening, e.g., a hole in the substrate 12, 12', the pressure sensor can be used as a reference-pressure sensor.

The layer of the aforementioned spin-on glass solution deposited in accordance with the invention, which is transformed into a cross-linked silicon-dioxide layer by the high-temperature brazing process, is not visible on the finished pressure sensor and, hence, in FIGS. 1 to 3.

Figure 4:
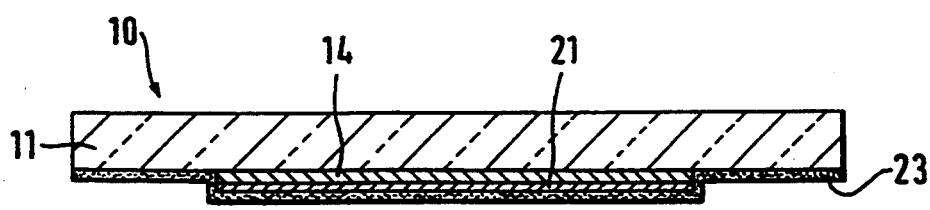
FIG. 4 shows a section of the two parts of the pressure sensor of FIG. 2 following the application of the spin-on glass solution.
Figure 4:
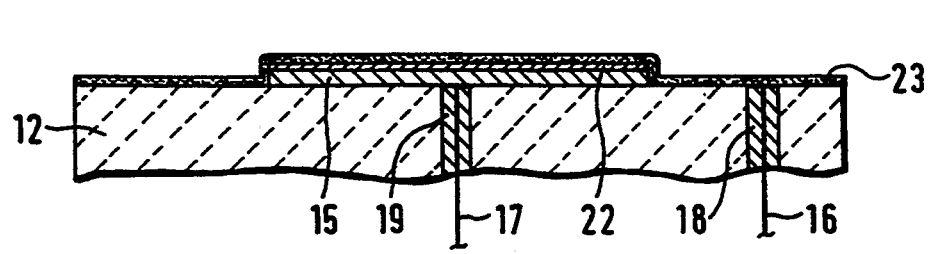

By contrast, in FIG. 4, the diaphragm 11 and the substrate 12 of the capacitive pressure sensor of FIGS. 1 and 2 are shown in a condition after a spin-on glass solution with a silicon-dioxide equivalent of not more than 10% was deposited, which can be done by spinning or spraying and results in the spin-on glass layer 23. The latter is quite thin, namely only about 200 nm thick, so that it is not drawn to scale in FIG. 4.

Figure 5:
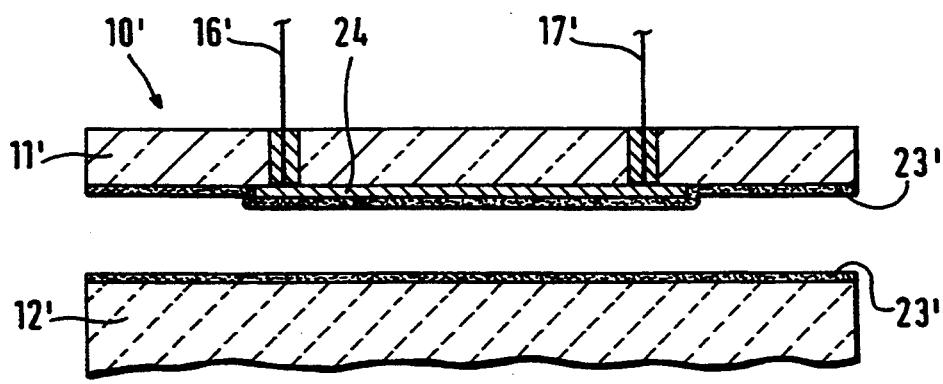
FIG. 5 shows a section of the two parts of the pressure sensor of FIG. 3 following the application of the spin-on glass solution.

FIG. 5 shows the diaphragm 11' and the substrate 12 of the resistive pressure sensor 10' of FIG. 3 in a similar view, again in the condition after a spin-on glass solution with a silicon-dioxide equivalent of not more than 10% was applied by spinning or spraying, which results in the spin-on glass layer 23'. The latter, too, is only about 200 nm thick, so that it is not drawn to scale in FIG. 5, either.

The diaphragm 11, 11' and the substrate 12, 12' are brazed together in a high vacuum of at least $10^{-5}$ hPa (=mbar) preferably in the range of $10^{-6}$ hPa (=mbar). A very good vacuum is necessary to avoid reactions of the respective brazing metal, particularly titanium, with the residual gas and achieve good wetting. The brazing temperature is advantageously 30° C. to 100° C. above the liquidus temperature to achieve an optimum reaction as well as high strength and gas tightness of the joint.

The spin-on glass layer 23, 23' surprisingly seals the uncovered surface portions of diaphragm 11, 11' and substrate 12, 12' so perfectly that the above-mentioned reduction during the brazing process practically no longer occurs.

This is shown by the following results of measurements performed on a capacitive reference-pressure sensor fabricated according to the invention which had the same dimensions as the above-mentioned reference-pressure sensor, and which was measured under the same conditions (temperature 20° C., zero pressure).

First, as above, only a substrate 12 was examined and coated with the spin-on glass solution. After the coated substrate had dried and then been heated to 400° C., a resistance of $1 \times 10^{13}$ ohms was measured at 0% relative humidity, and $1 \times 10^{13}$ ohms at 70% relative humidity. This is already a significant improvement over the above values for an uncoated substrate.

If the coated substrate was heated to approximately 900° C., which temperature corresponds to the brazing-temperature range of the pressure sensor, a resistance of $5 \times 10^{12}$ ohms was measured at 70% relative humidity; the value for 0% relative humidity was unchanged.

This considerably improved resistance also has an effect on the characteristics of a capacitive pressure sensor: Between 30% and 85% relative humidity, the capacitance difference was only 0.2 pF at a tangent-delta difference of 0.005, and the reference-capacitance difference was 0.4 pF at a tangent-delta difference of 0.01.

In the case of the pressure sensors described above, care must be taken in selecting the composition of the spin-on glass solution with the aid of manufacturer's data to ensure that after the brazing process, no hydrocarbon bonds, such as in siloxanes, will occur in the crosslinked silicon dioxide, i.e., that pure silicate, phosphosilicate, or the like is present, because otherwise the humidity sensitivity will not be sufficiently reduced.

I claim:

1. A method of providing a protective barrier on an object made of ceramic, glass, or a single-crystal insulating material which is subsequently subjected to a heating process, the method including the steps of applying a thin layer of a spin-on glass solution with a silicon-dioxide equivalent content of not more than 10% to the object, and drying the object before the object subjected to the heating process.

2. The method of claim 1, wherein the spin-on glass solution is applied to the surface of the object by spinning.

3. The method of claim 1, wherein the spin-on glass solution is applied to the surface of the object by spraying.

4. The method of claim 1, wherein the vacuum is at least $10^{-5}$ mbar.

5. The method of claim 1, wherein the vacuum is at least $10^{-6}$ mbar.

6. A method of manufacturing a capacitive pressure sensor having a substrate and a diaphragm to be joined together, particularly in a defined spaced relationship and parallel to each other, forming a chamber sealed at least at the edge, with the substrate and/or the diaphragm made of ceramic, glass, or a single-crystal insulating material, the method comprising the following steps:

the diaphragm is covered with a layer of a conductive material including silicon carbide, niobium, or tantalum serving as a first capacitor electrode;

a portion of the substrate surface which will lie within the chamber is covered with at least one additional layer of said conducting material serving as a second capacitor electrode;

over the entire surface portion of the substrate and diaphragm thus covered, a thin layer of a spin-on glass solution with a silicon-dioxide equivalent content of not more than 10% is applied by spinning or spraying, and dried;

a first electrical lead is coupled to the first capacitor electrode, and a second electrical lead is coupled to the second capacitor electrode, and the substrate and the diaphragm are high-vacuum-brazed together by means of a ring-shaped part of active brazing material, which also services as a spacer, or by means of an amount of active brazing paste sufficient for holding the two parts at the desired distance from each other.

7. The method as claimed in claim 6 wherein prior to the application of the spin-on glass solution, the capacitor electrodes are covered with a protective layer.

8. A method of manufacturing a resistive pressure sensor having a substrate and a diaphragm to be joined together, particularly in a defined spaced relationship and parallel to each other, forming a chamber sealed at least at the edge, with the substrate and/or the diaphragm made of ceramic, glass or a single-crystal insulating material, the method comprising the following steps:

the surface portion of the diaphragm which will lie within the chamber is covered with at least one strain gage;

over the entire surface portion of the diaphragm thus covered and over an entire surface portion of the substrate which will lie opposite said surface portion of the diaphragm, a thin layer of a spin-on glass solution with a silicon-dioxide equivalent content of not more than 10% is applied by spinning or spraying, and dried;

contact is made between first and second electrical leads and the at least one strain gage through the diaphragm, and the substrate and the diaphragm are high-vacuum-brazed together by means of a ring-shaped part of active brazing material, which also serves as a spacer, or by means of an amount of active brazing paste sufficient for holding the two parts at the desired distance from each other.

9. A method for manufacturing a capacitive pressure sensor having a substrate and a diaphragm coupled to the substrate in a spaced apart and parallel relation to form a chamber therebetween, the substrate and the diaphragm being made of ceramic, glass, or a single-crystal insulating material, the method comprising the steps of:

covering a surface of the diaphragm configured to face the substrate with a layer of silicon carbide, niobium, or tantalum to form a first capacitor electrode;

covering a portion of a substrate surface configured to face the diaphragm with at least one layer of silicon carbide, niobium, or tantalum to form a second capacitor electrode;

applying a layer of a spin-on glass solution having a silicon-dioxide equivalent content of not more than 10% to said diaphragm surface and said substrate surface;

drying the spin-on glass solution;

coupling first and second electrical leads to the first and second capacitor electrodes, respectively;

positioning an active brazing material between the substrate and the diaphragm for coupling the substrate to the diaphragm so that the substrate is spaced apart from the diaphragm by a predetermined distance; and heating the substrate, the diaphragm, and the active brazing material in a vacuum to seal the substrate to the diaphragm.

10. The method of claim 9, wherein the spin-on glass solution is applied to the surface of the object by spinning.

11. The method of claim 9, wherein the spin-on glass solution is applied to the surface of the object by spraying.

12. The method of claim 9, wherein the vacuum is at least $10^{-5}$ mbar.

13. The method of claim 9, wherein the vacuum is at least $10^{-6}$ mbar.

14. The method of claim 9, wherein the heating step heats the substrate, the diaphragm, and the active brazing material to a temperature of about 30° C. to about 100° C. above a liquidous temperature of the active brazing material.

15. The method of claim 9, wherein prior to the step of applying the spin-on glass solution, the method includes the step of covering the first and second capacitor electrodes with a protective layer.

16. A method of manufacturing a resistive pressure sensor having a substrate and a diaphragm coupled to the substrate in a spaced apart, parallel relation to form a chamber therebetween, the substrate and the diaphragm being made of ceramic, glass or a single-crystal insulating material, the method comprising the steps of:

covering a surface portion of the diaphragm configured to lie within the chamber with at least one strain gage;

applying a layer of a spin-on glass solution having a silicon-dioxide equivalent content of not more than 10% to the surface portion of the diaphragm and to a surface portion of the substrate configured to lie within the chamber opposite said surface portion of the diaphragm;

drying the spin-on glass solution;

coupling first and second electrical leads to the at least one strain gage through the diaphragm;

positioning an active brazing material between the substrate and the diaphragm for coupling the substrate to the diaphragm so that the substrate is spaced apart from the diaphragm by a predetermined distance; and heating the substrate, the diaphragm, and the active brazing material in a vacuum to bond the active brazing material to the substrate and the diaphragm.

17. The method of claim 16, wherein the spin-on glass solution is applied to the surface of the object by spinning.

18. The method of claim 16, wherein the spin-on glass solution is applied to the surface of the object by spraying.

19. The method of claim 16, wherein the vacuum is at least $10^{-5}$ mbar.

20. The method of claim 16, wherein the vacuum is at least $10^{-6}$ mbar.

21. The method of claim 16, wherein the heating step heats the substrate, the diaphragm, and the active brazing material to a temperature of about 30° C. to about 100° C. above a liquidous temperature of the active brazing material.

22. The method of claim 16, wherein active brazing material is a ring-shaped part.

* * * * *

UNITED STATES PATENT AND TRADEMARK OFFICE
CERTIFICATE OF CORRECTION

PATENT NO. : 5,400,489
DATED : March 28, 1995
INVENTOR(S) : Frank Hegner et al

It is certified that error appears in the above-indentified patent and that said Letters Patent is hereby corrected as shown below:

On the title page, item [73] insert:

Endress + Hauser GmbH + Co., Germany--

Signed and Sealed this

Fourth Day of July, 1995

*Attest:*

BRUCE LEHMAN

*Attesting Officer*      *Commissioner of Patents and Trademarks*